United States Patent [19]

Nardella et al.

[11] Patent Number: 5,230,140
[45] Date of Patent: Jul. 27, 1993

[54] PROCESS FOR ENVIRONMENTALLY SAFE DISPOSAL OF USED FLUORESCENT LAMP POTTED BALLAST ASSEMBLIES WITH COMPONENT PART RECLAMATION AND/OR RECYCLING

[75] Inventors: Anthony Nardella, 95 Beals St., Brookline, Mass. 02146-3010; Bruce Norian, Newton, Mass.

[73] Assignee: Anthony Nardella, Brookline, Mass.

[21] Appl. No.: 782,527

[22] Filed: Oct. 24, 1991

[51] Int. Cl.⁵ .............................................. H01F 7/00
[52] U.S. Cl. .................................... 29/609; 29/403.3; 29/403.4; 29/426.4; 241/DIG. 37
[58] Field of Search ............... 29/609, 25.42, 403.3, 29/403.4, 426.4; 445/2, 61; 241/DIG. 37

[56] References Cited

U.S. PATENT DOCUMENTS 3,885,744  5/1975  Moore et al. ............ 241/DIG. 37 X
4,813,614  3/1989  Drage ....................... 241/DIG. 37 X Primary Examiner—Carl E. Hall
Attorney, Agent, or Firm—Rines & Rines

[57] ABSTRACT

A process for the environmentally safe disposal of used fluorescent lamp potted ballast assemblies and the like, with the potential for component part reclamation and/or recycling, involving preferred cryogenic freezing of the potted assembly to the extent that the frozen potting becomes sufficiently brittle throughout to enable it to be pulverized away in small particles, cleanly from all the components, with only that component with a hazardous material needing to be incinerated or otherwise environmentally safely disposed of, and with all the other components and parts in condition for salvage, re-use, and/or reclamation.

5 Claims, 6 Drawing Sheets

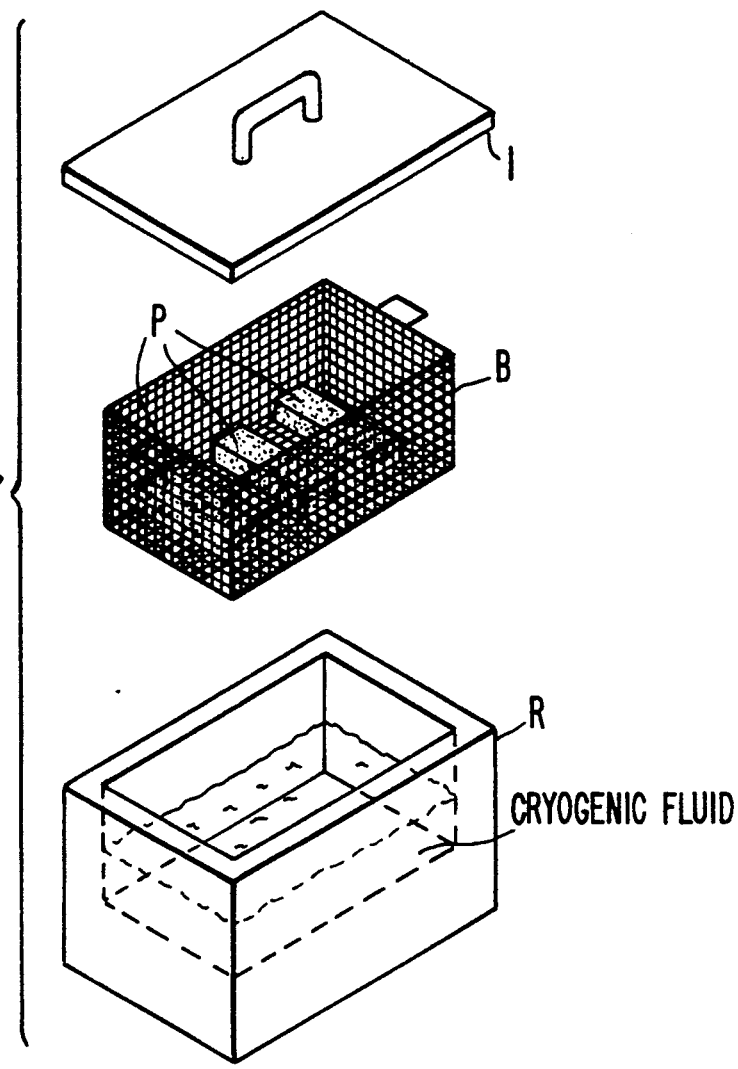
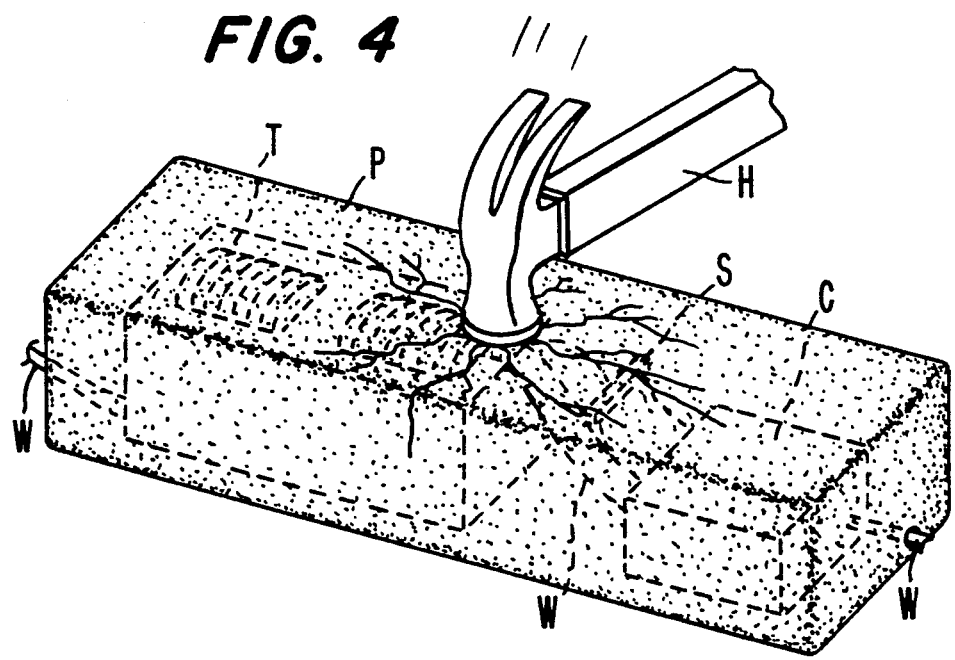

PROCESS FOR ENVIRONMENTALLY SAFE DISPOSAL OF USED FLUORESCENT LAMP POTTED BALLAST ASSEMBLIES WITH COMPONENT PART RECLAMATION AND/OR RECYCLING

The present invention relates to processes for disposing of composite potted electrical component assemblies and the like with environmental safety and cost efficiency, and with safe component and part reclamation and/or recycling where desired, being more particularly concerned with used fluorescent light ballast assemblies often containing only select components, such as capacitors, with environmentally hazardous constituents such as pcb's (polychlorinated biphenyls) and the like.

BACKGROUND OF INVENTION

The problem of disposing of used fluorescent light ballast assemblies has plagued commercial and other institutions for some years, particularly in view of relatively recent state and federal regulations governing perpetual legal responsibility for their disposal and the environmental safety of the waste products of such disposal.

The concomitant problem of enabling conservation or salvaging of those valuable components and materials not presenting hazard difficulties by reclamation and reuse, refurbishing and/or recycling of the valuable materials therein (metals, wires and windings, plastics, etc.) often must be ignored in the light of this perpetual environmental safety responsibility, leading to expensive incineration or other blanket waste of the total products as in land fill, etc., just because hazards may exist only in limited parts thereof.

It is just such a circumstance that exists with used fluorescent light ballasts containing potted assemblies of electrical components and the like embedded in the potting and wherein only a very small weight or volume percentage of the product may involve highly environmentally hazardous materials; the remainder or bulk of the product, however, being admirably suited for valuable reclamation and/or recycling, leading none-the-less to the current-day practice of wasting the whole opportunity for such reclamation and/or recycling in incinerating or breaking up and/or burying the complete product just because, for example, the capacitor component thereof may contain the before-mentioned hazardous pcb's or the like.

OBJECT OF INVENTION

It is an object of the present invention, accordingly, to provide a new and improved process for the disposal of such used potted ballasts and the like that provides totally adequate security and low cost efficiency for the perpetual environmental safety in the disposal of the potentially hazardous component or materials thereof, while simultaneously enabling safe and substantially pristine condition reclamation and/or recycling of the remaining major components of the product.

An additional object is to provide such a novel process with the added advantage of cost benefit over the above-described current-day disposal practices.

Other and further objects will be explained hereinafter and are more particularly delineated in the appended claims.

SUMMARY

In summary, however, from one of its broader viewpoints, the invention embraces a process for the environmentally safe and economical disposal of used fluorescent lamp potted ballast housing assemblies and the like, that comprises, removing from the housing the potted assembly with its embedded electrical component assemblies including a component such as a capacitor containing environmentally hazardous material such as pcb's; after or before such removing immersing the potted assembly in a cryogenic bath and freezing the same to the extent of rendering the potting sufficiently brittle to fragment into fine pieces upon being impacted; impacting the potting thoroughly to fragment the same into small pieces and cleanly to remove substantially all traces of the potting from all the electrical components and parts embedded therein and without imparting damage to said components and parts; disconnecting the said component containing the environmentally hazardous material; and incinerating only the said component containing the environmentally hazardous material, leaving all other components and parts including said housing and potting fragments for salvage, re-use and/or recycling as desired and appropriate. Preferred and best mode embodiments are later described.

DRAWINGS

The invention will now be explained in connection with the accompanying drawings, FIG. 1 of which is an isometric view of a (used) fluorescent lighting ballast containing an outer sheet metal housing, and an inner potted electrical assembly. The integral wiring used to connect the ballast to the lamp sockets and the power supply is also schematically shown.

FIG. 2 is a similar view of the ballast with the sheet metal cover removed. The asphaltic potting compound essentially takes the form of the sheet metal housing into which it is poured during the manufacturing process. It is this configuration that is subjected to the cryogenic bath.

FIG. 3 illustrates a quantity of potted ballasts stacked in a wire basket which fits into an insulated container partially filled with a cryogenic fluid, typically liquid nitrogen.

FIG. 4 shows the condition of the frozen and embrittled ballast assembly after it has been immersed in the cryogenic bath for the prescribed time interval and removed, and is now struck several blows by schematically illustrated hammering or similar impacting, fragmenting the embrittled potting.

DESCRIPTION OF PREFERRED EMBODIMENT

Figure 1:
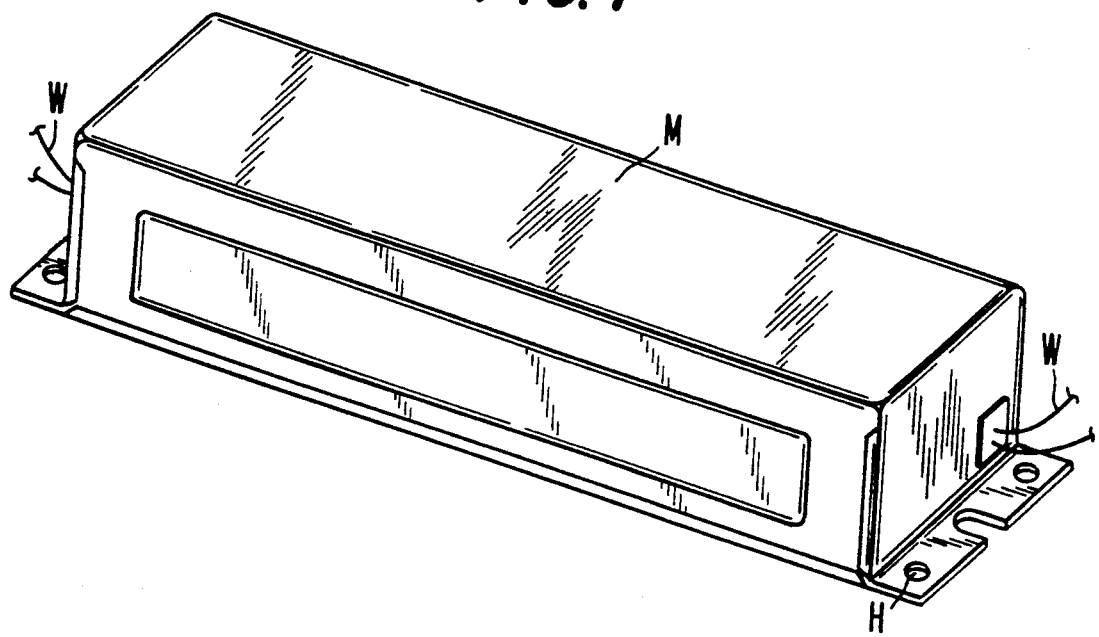
Figure 2:
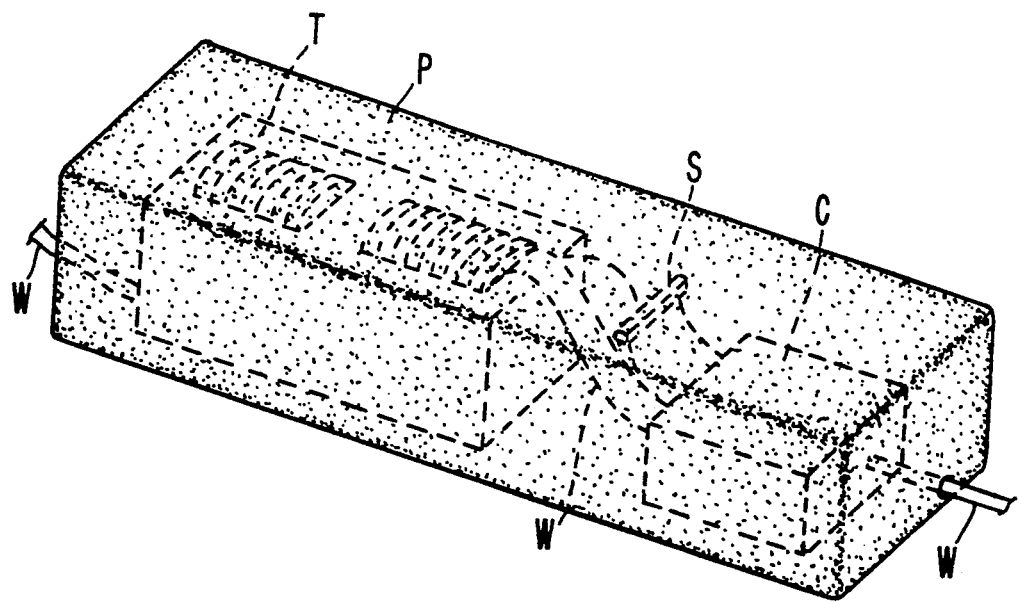

Referring to FIG. 1, connecting electrical wires W, are cut from the ballast using wire cutters, and stored for reclamation as scrap copper. The removal of the painted sheet metal cover M is facilitated by countersinking or drilling the staked holes H, which also form the means by which the ballast is attached to the lighting fixture using screws or other suitable fasteners. The cover is separated from the ballast and removed using simple hand tools, revealing the potted ballast P, FIG. 2, with the embedded electrical components, shown as a transformer T, a starter and a capacitor C that, as before described, may be the only component harboring environmentally dangerous materials.

Several of the potted assemblies P, as shown in FIG. 3, are then placed in a wire basket B, which fits into a liquid-tight, insulated container R subjected to a measured flow or quantity of a cryogenic fluid, so labelled, typically liquid nitrogen. The quantity of cryogenic fluid required is a function of the heat of vaporization of the fluid used and the weight (or, more accurately, the total specific heat) of the ballasts, as well as the basket and inner surfaces of the container. Upon the closing of the container by the insulated cover 1, the potted ballast assemblies P become rapidly cooled and embrittled. After a suitable immersion time, sufficient to embrittle the potting compound not only externally but thoroughly internally to its core where it has attached to the embedded components, the assemblies are removed from the cryogenic fluid and impacted with one or more blows with a hammering device or suitable instrument capable of delivering the required fragmenting impact, shown in FIG. 4 as effected by a hammer H as where manual operation is employed; it being understood that suitable well-known impacting or crushing apparatus may be used for automated or production line operation, including alternative systems later discussed.

Figure 5:
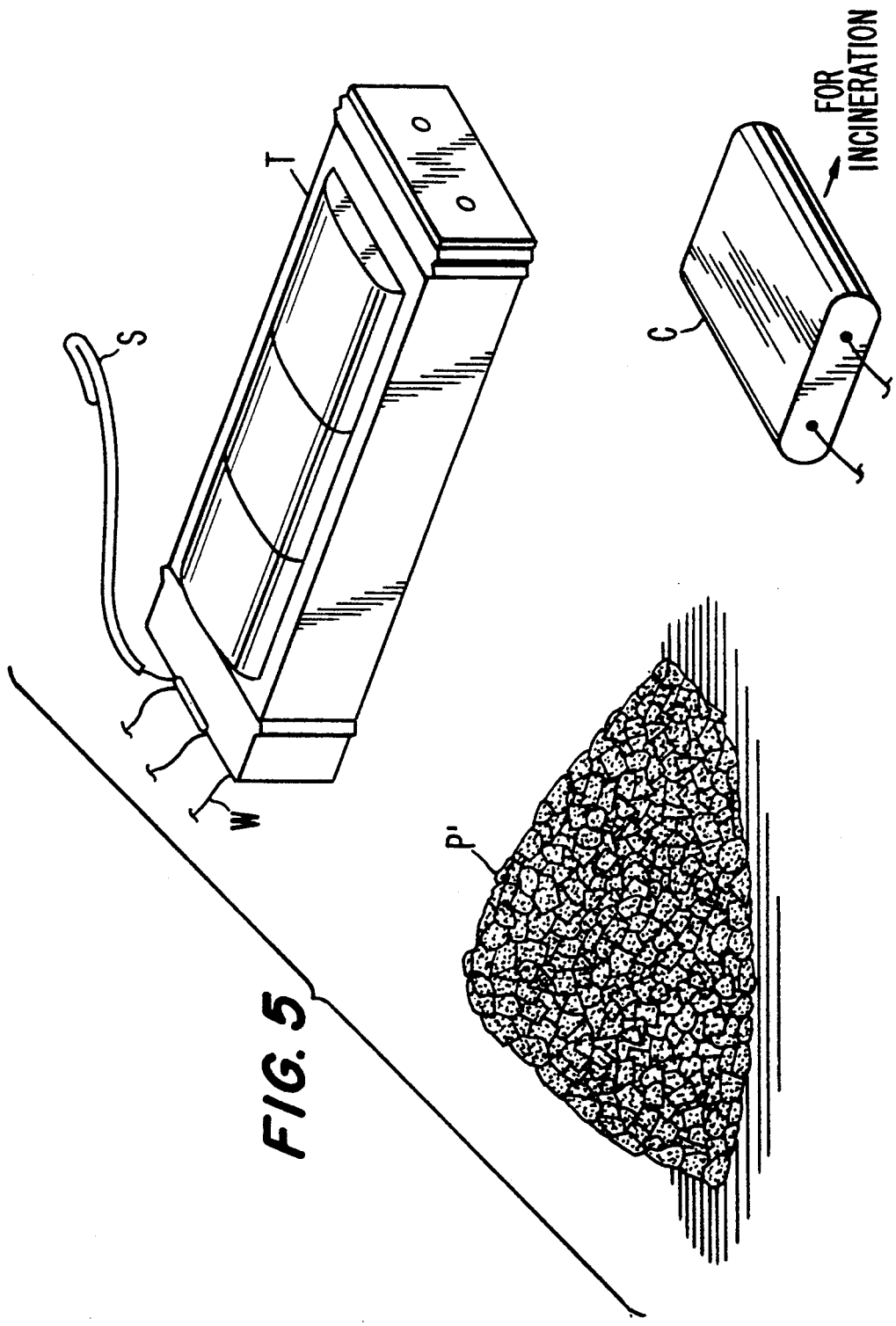
FIG. 5 illustrates the separation of the components after the impacting step of FIG. 4, showing the substantially pristine and undamaged components and asphaltic potting compound suitable for reclamation, with the capacitor only requiring environmentally safe disposal, being preferably incinerated.

The brittle potting compound fragments and pulverizes into random-shaped particles ranging in size from fine particulates to chunks as large as a one inch cube, shown in a collected pile P' in FIG. 5, with the previously potted electrical components (transformer T, .starter S, capacitor C) emerging from the potting compound in a relatively pristine and undamaged condition, essentially free from the potting compound, with small residual particles of compound of no consequence.

As an illustration, for a common right rectangular parallelopiped asphaltic potted fluorescent light ballast as shown, about 6"×3"×2" in dimensions, immersion in a liquid nitrogen bath, with a nominal temperature of −320° F. for approximately eight minutes has been found satisfactory to cool the core to a temperature of approximately −50° F. Although higher temperatures (i.e., shorter immersion times) will yield useful results, the lower temperature provides a longer working time after the ballast is removed from the bath, but before it is impacted.

Several blows with a hammer or similar impacting tool, at an energy level of ten to twenty foot pounds, more or less, are then sufficient thoroughly to fracture and fragment the potting compound into irregular random-sized pieces and particulates, effectively to separate the potting compound from the previously potted components, and the myriad of interconnecting wires W, terminal lugs etc., which may be separated for salvage, as well.

While plastic or rubber-metal parts have heretofore been separated and recovered intact by a measure of cryogenic freezing, as, for example, in U.S. Pat. No. 1,978,204, in accordance with the present invention, the freezing is carried to the extent sufficient to guarantee both the total pulverizing destruction of the potting, and its substantially total and clean separation from the parts it enclosed and to which it had conformed and adhered in the potting process.

At this stage, moreover, the unpotted and exposed electrical components in the core are also frozen, requiring care to avoid hand burns in cutting and removing the electrical connections to the capacitor C, so that such may be disconnected and freed for its preferred safe incineration or other safe disposal, FIG. 5.

The remaining different metal and wire parts (copper, aluminum, steel) and the transformer T and other components, and any other paper or plastic separators or other parts (not shown) have been thus recovered in clean condition for independent collection and ultimate salvage and/or recycling. The fragmented asphalt P' may itself be swept down a chute into a barrel for its reclamation, if desired.

For a conventional four pound ballast assembly of this character, only about 5% of the total weight is attributable to the capacitor C. About 95% of the energy and effluent otherwise required for complete incineration of the total ballast, as is common current practice, is thus conserved. The costs of cryogenic freezing, pulverizing and component separation underlying the process is easily absorbed in the cost-saving of incinerating only the hazardous capacitor., even assuming little or no profit in used component salvage. Environmentally safe and economic disposal is thus achieved.

Figure 6A:
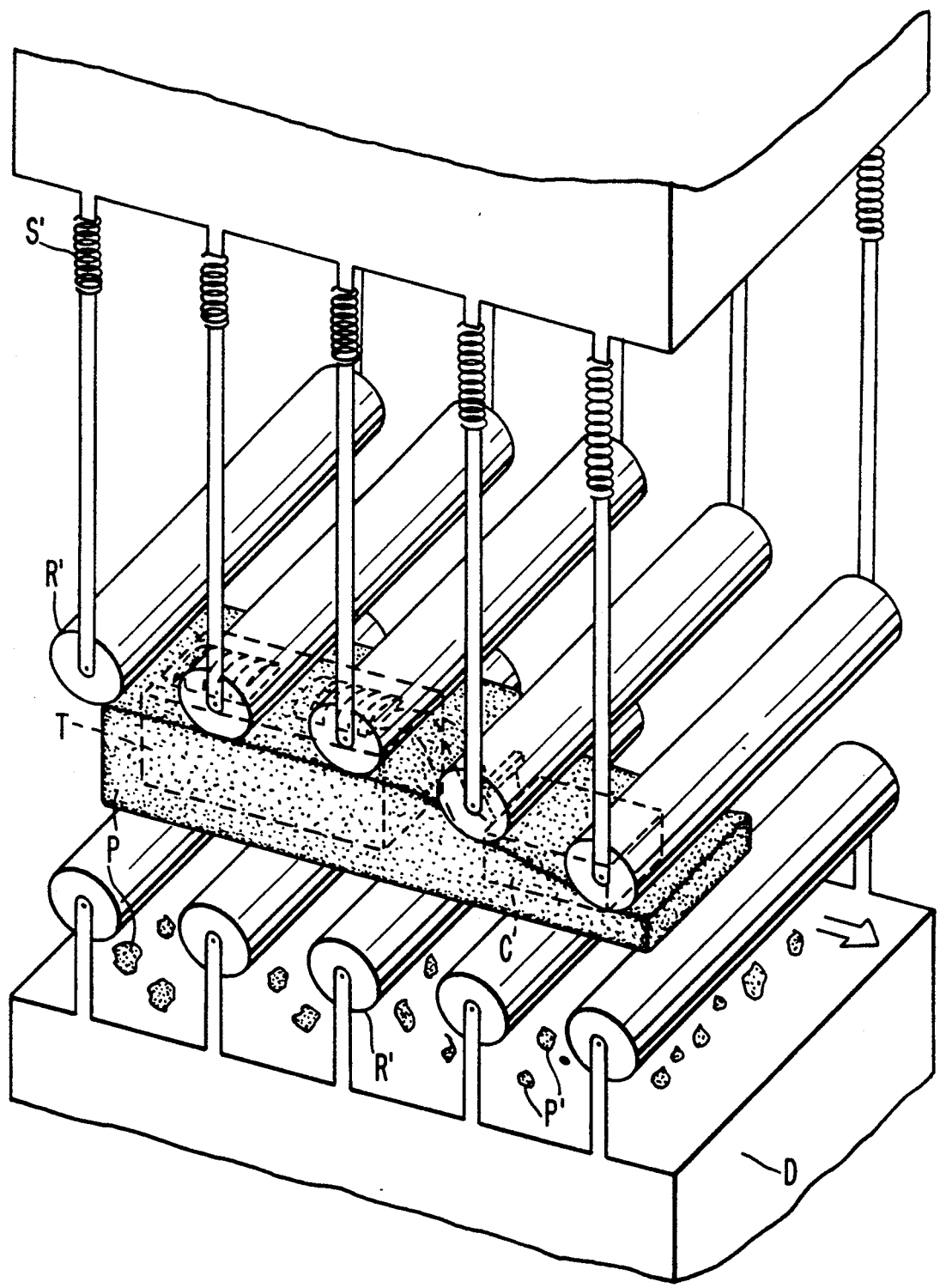
FIGS. 6A, 6B and 7 illustrate modified impacting and pulverizing techniques, FIGS. 6A and B showing roller crushing, and FIG. 7, compacting.
Figure 6B:
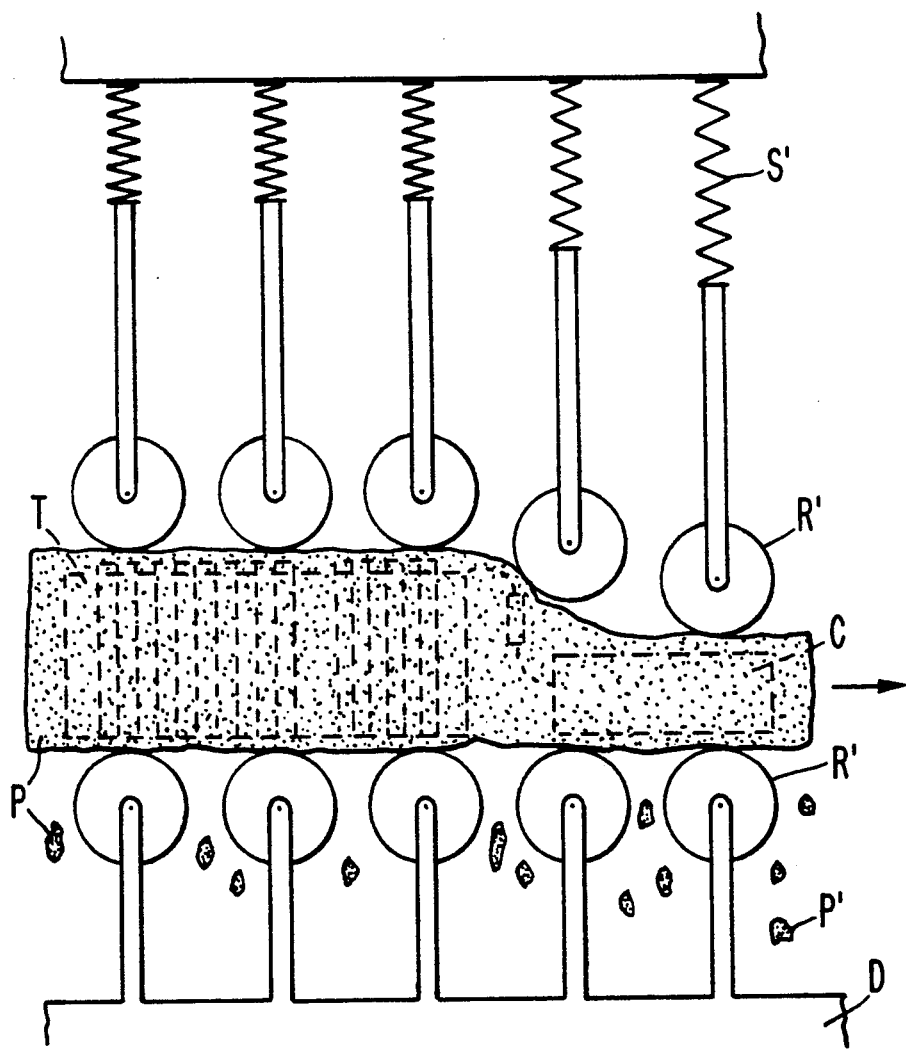
Figure 7:
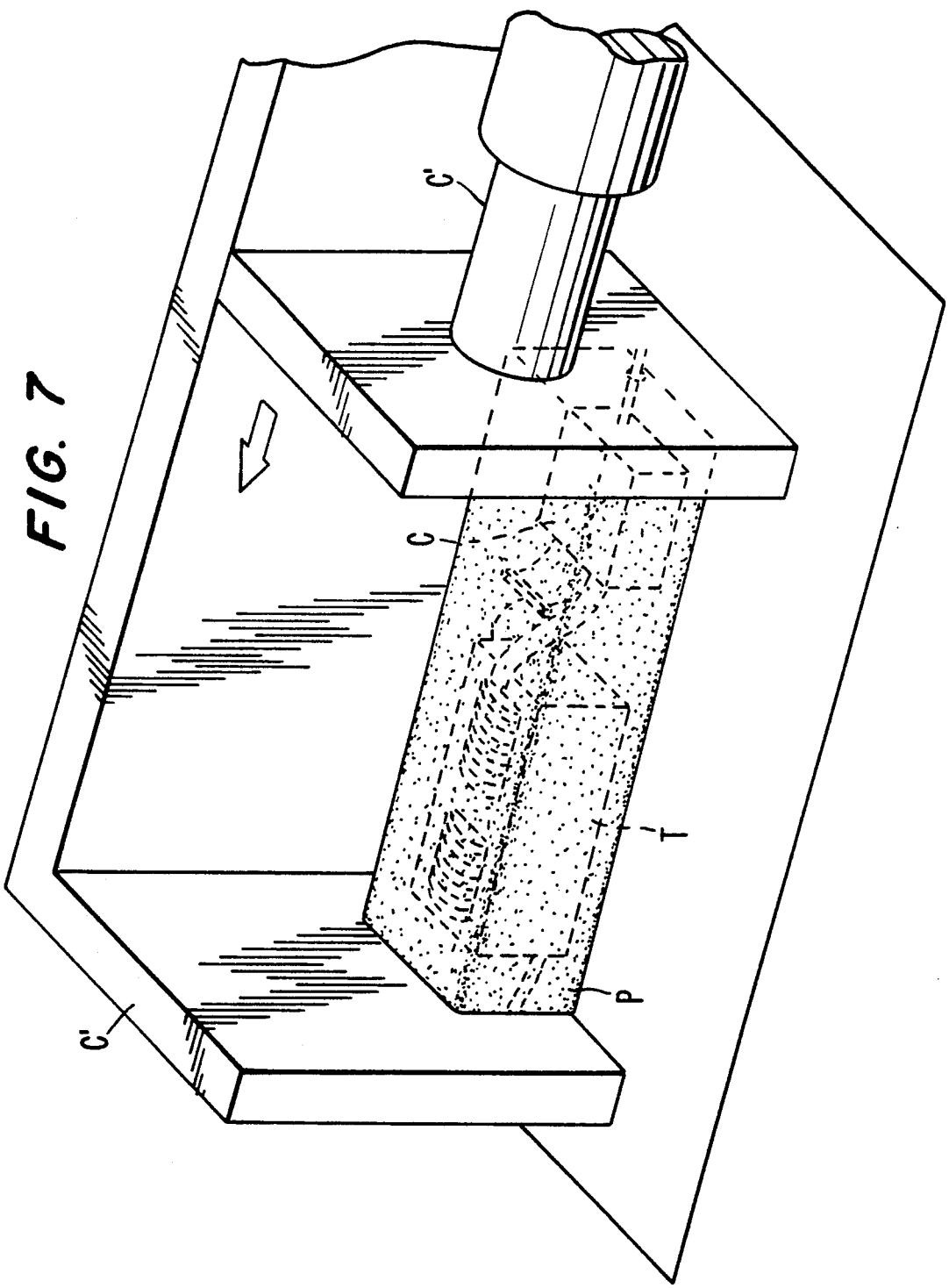

In addition to hammering techniques for impacting, crushing and removing the potted compound, as before stated, other techniques for accomplishing this result may also be used as shown in FIGS. 6A, 6B and 7. In the embodiment of FIGS. 6A and 6B, the impacting is effected by a roller system which crushes the potted material when the frozen ballast is placed between sets of rollers R' with fixed or adjustable spring or other pressures, as at S'. In FIG. 6B, the rollers R' on the top and to the right are crushing the potted materials as the embrittled ballast P is moved along the rollers, left to right. Potting material then falls into a receptacle D through the bottom rollers. In FIG. 7, on the other hand, the potted ballast assembly is placed in a piston or spring actuated compactor, the surfaces C' of which strike and compress the ends or sides of the embrittled potted ballast P with predetermined pressures. The compactor surfaces shatter the potted covering without damaging the components embedded therein; and the fragmented potting may again be swept away to a receptacle.

While the use of adequate cryogenic freezing and then impacting is the preferred and most rapid form of potting fragmentation and substantially total removal from the electrical components, and without damaging or defacing the components, some potting compounds may lend themselves to other total removal processes including ultrasonic cracking or chemical removal, for example. The hazard-material-containing component(s)-to-be-incinerated or otherwise safely disposed of, moreover, may be other than the capacitor; and the geometry of the housing and assembly, and even type of electrical assembly and product to be disposed of may be different, as well.

Further modifications,including, if more convenient, freezing the potted assembly while still in the cover housing M and then removing therefrom, will occur to those skilled in this art, and such are considered to fall within the spirit and scope of the invention as defined in the appended claims.

What is claimed is:

1. A process for the environmentally safe and economical disposal of used fluorescent lamp potted ballast housing assemblies comprising removing from the housing the potted assembly with its embedded electrical component assemblies including a component capacitor containing environmentally hazardous material pcb's; after or before such removing, immersing the potted assembly in a cryogenic bath and freezing the same to render the potting sufficiently brittle to fragment into small pieces upon being impacted; impacting the potting thoroughly to crush and fragment the same into small pieces and to cleanly remove substantially all traces of the potting from all the electrical components and parts embedded therein and without imparting damage to said components and parts; disconnecting the said component containing the environmentally hazardous material; and incinerating only the said component containing the environmentally hazardous material, leaving all other components and parts including said housing and potting fragments for salvage, re-use and/or recycling.

2. A process as claimed in claim 1 and in which the said other components and parts comprise wires, different metal parts, a transformer and a starter which are disassembled and separated by different metals, wires for independent recycling.

3. A process as claimed in claim 1 and in which said potting is of asphalt-tar and the cryogenic freezing is effected over the complete potted assembly to ensure that the core of the assembly achieves a temperature of about $-50°$ F. to attain sufficient brittleness to enable small impact fragmentation of potting particles and substantially total removal of potting particles from the electrical components and parts once embedded therein.

4. A process as claimed in claim 1 and in which said impacting is effected by one or more of hammering, roll-crushing and compactor impacting.

5. A process for the environmentally and safe and economical disposal of used potted assemblies containing embedded electric components and parts including one or more components containing environmentally hazardous material comprising immersing the potted assembly in a cryogenic bath and freezing the same to render the potting sufficiently brittle to fragment into fine pieces upon being impacted; impacting the frozen brittle potting thoroughly to crush and fragment the same into small pieces and to cleanly remove substantially all traces of the potting from all the electrical components and parts embedded therein and without imparting substantial damage to said components and parts; disconnecting the said one or more components containing environmentally hazardous material; and incinerating or burying only said one or more components, leaving all the other components and parts including the potting fragments for recycling and/or salvage.

* * * * *